US008426834B2

(12) United States Patent
Kleinschmidt

(10) Patent No.: US 8,426,834 B2

(45) Date of Patent: Apr. 23, 2013

(54) METHOD AND APPARATUS FOR THE GENERATION OF EUV RADIATION FROM A GAS DISCHARGE PLASMA

(75) Inventor: Juergen Kleinschmidt, Jena (DE)

(73) Assignee: XTREME technologies GmbH, Aachen (DE)

( * ) Notice: Subject to any disclaimer, the term of this patent is extended or adjusted under 35 U.S.C. 154(b) by 57 days.

(21) Appl. No.: 13/239,564

(22) Filed: Sep. 22, 2011

(65) Prior Publication Data

US 2012/0080619 A1 Apr. 5, 2012

(30) Foreign Application Priority Data

Oct. 1, 2010 (DE) ........................ 10 2010 047 419

(51) Int. Cl.
*G01J 3/10* (2006.01)

(52) U.S. Cl.
USPC ........................ 250/504 R; 378/119; 378/144

(58) Field of Classification Search .............. 250/504 R; 378/119, 144
See application file for complete search history.

(56) References Cited

U.S. PATENT DOCUMENTS

| | | | | |
|---|---|---|---|---|
| 4,504,964 | A * | 3/1985 | Cartz et al. | 378/119 |
| 7,164,144 | B2 * | 1/2007 | Partlo et al. | 250/504 R |
| 7,399,981 | B2 * | 7/2008 | Cheymol et al. | 250/504 R |
| 2003/0006383 | A1 * | 1/2003 | Melnychuk et al. | 250/504 R |
| 2004/0140439 | A1 * | 7/2004 | Shell et al. | 250/504 R |
| 2006/0192157 | A1 * | 8/2006 | Gaebel et al. | 250/504 R |
| 2006/0243927 | A1 * | 11/2006 | Tran et al. | 250/504 R |
| 2007/0152175 | A1 * | 7/2007 | Moors et al. | 250/493.1 |
| 2007/0181834 | A1 * | 8/2007 | Kleinschmidt | 250/504 R |
| 2008/0006783 | A1 * | 1/2008 | Hergenhan et al. | 250/504 R |
| 2008/0258085 | A1 * | 10/2008 | Bauer | 250/504 R |
| 2008/0277599 | A1 * | 11/2008 | Soer et al. | 250/492.22 |
| 2009/0127479 | A1 * | 5/2009 | Hosokai et al. | 250/504 R |
| 2010/0181503 | A1 * | 7/2010 | Yanagida et al. | 250/504 R |
| 2011/0248192 | A1 * | 10/2011 | Jonkers et al. | 250/504 R |
| 2012/0175533 | A1 * | 7/2012 | Moriya et al. | 250/504 R |

FOREIGN PATENT DOCUMENTS

| | | | |
|---|---|---|---|
| DE | 10359464 | A1 | 7/2005 |
| DE | 102005039849 | A1 | 3/2007 |
| DE | 102006027856 | B3 | 11/2007 |
| DE | 602004006281 | T2 | 1/2008 |
| EP | 2051140 | A1 | 4/2009 |
| EP | 2203033 | A2 | 6/2010 |
| WO | 2009105247 | A1 | 8/2009 |

* cited by examiner

*Primary Examiner* — David A Vanore
*Assistant Examiner* — Wyatt Stoffa
(74) *Attorney, Agent, or Firm* — Patentbar International, P.C.

(57) ABSTRACT

The invention relates to a method and an apparatus for generating EUV radiation from a gas discharge plasma. The object of the invention, to generate EUV radiation from a gas discharge plasma by with is optimized conversion efficiency of the EUV emission while locally limiting the electric discharge channel, is met in that a channel-generating beam of pulsed high-energy radiation is supplied in at least two partial beams which are focused in a pulse-synchronized manner into a superposition region along a spacing axis between the electrodes, and an electrically conductive discharge channel is generated along the superposition region due to an ionization at least of a buffer gas present in the discharge space, wherein the pulsed high-energy radiation of the channel-generating beam is triggered in such a way that the discharge channel is generated before a discharge current pulse has reached its maximum value.

16 Claims, 9 Drawing Sheets

METHOD AND APPARATUS FOR THE GENERATION OF EUV RADIATION FROM A GAS DISCHARGE PLASMA

RELATED APPLICATIONS

This application claims priority to German Patent Application No. DE 10 2010 047 419.3, filed Oct. 1, 2010, which is incorporated herein by reference in its entirety.

FIELD OF THE INVENTION

The invention is directed to a method and an apparatus for generating EUV radiation from a gas discharge plasma in which an emitter material in a discharge space which is located between electrodes and contains at least a buffer gas is vaporized by irradiation with pulsed high-energy radiation of a vaporizing beam and is converted to a discharge plasma emitting EUV radiation by means of a pulsed discharge current generated between the electrodes.

BACKGROUND OF THE INVENTION

It is known from the prior art (e.g., EP 2 203 033 A2) to vaporize liquid or solid emitter materials by means of a beam of high-energy radiation for generating a gas discharge plasma emitting EUV radiation. This vaporization is carried out in a discharge space between two electrodes to which a pulsed high voltage is applied in order to generate a discharge current through the vaporized emitter material in such a way that the emitter material is converted as completely as possible into a gas discharge plasma.

The emitter material can be fixedly arranged on the surface of the electrodes or, as is described in DE 10 2005 039 849 A1, can be continuously applied as a melt to electrodes which are constructed as rotating electrodes, a portion of whose circumference is immersed, respectively, in a bath with molten emitter materials.

Further, it is known to inject emitter materials in a regular sequence of droplets between the electrodes as is also described, e.g., in DE 10 2005 039 849 A1. The distance between the electrodes and the location of plasma generation can be maximized by means of a solution of this kind so that the lifetime of the electrodes is increased.

When the emitter material is injected in droplets, the buffer gas, which usually serves to brake the high-energy particles developing in plasma generation (debris mitigation), moreover in ionized form, acts as an electrically conducting medium. This conducting medium is used to supply a droplet of emitter material with the electric power necessary for heating and for the generation of a plasma.

This has the disadvantage that the ionized buffer gas and possibly also gaseous residues of emitter material originating from previous discharges are widely distributed in the discharge space, as a result of which the discharge current between the electrodes does not flow in a targeted manner through a selected droplet of emitter material but, rather, a substantial proportion of the discharge current flows around the emitter material droplet. Because of this effect, the conversion efficiency, i.e., the ratio of energy used to the EVU radiation energy generated, remains low.

EP 2 051 140 A1 discloses a method and a device by which an electrically conductive discharge region is generated between two disk-shaped electrodes in a discharge space. To this end, a pulsed high-energy beam is directed into a focus with a defined focus length. This focus length extends perpendicular to the desired path of the discharge current and a high excitation energy is supplied along the entire focus length between the electrodes. An emitter material is supplied at a certain distance (Rayleigh range) from the desired discharge channel and is vaporized by the action of the excitation beam. The mixture of vaporized emitter materials and buffer gas formed in this way arrives in the discharge space between the electrodes. By applying a pulse of the excitation beam to the gas again in a suitably timed manner, the ionized residual gas is further excited in the area in which the discharge channel is to be generated and, at the same time, a voltage pulse is supplied to the electrodes causing an electrically conductive discharge channel for the electric discharge between the electrodes and the formation of a gas discharge plasma.

This has the disadvantage that an excitation of the ionized residual gas over the entire electrode spacing is impossible because of the beam geometry that must be maintained. Further, because of the large focus length of the excitation beam within the discharge space, there is a high buffer gas ionization between the electrode surfaces over relatively large areas, which impedes the formation of a narrowly circumscribed discharge channel.

SUMMARY OF THE INVENTION

It is the object of the invention to find a possibility for generating EUV radiation from a gas discharge plasma by which the conversion efficiency of the EUV emission is optimized while locally limiting the electric discharge channel.

In a method for generating EUV radiation from a gas discharge plasma in which an emitter material in a discharge space which is located between electrodes and contains at least a buffer gas is vaporized by irradiation with pulsed high-energy radiation of a vaporizing beam and is converted into a discharge plasma emitting EUV radiation by means of a discharge current flowing in a pulsed manner between the electrodes, the above-stated object is characterized in that

- a channel-generating beam of a pulsed high-energy radiation is supplied in at least two partial beams;
- the partial beams are shaped, focused and directed into the discharge space in such a way that beam waists of the partial beams overlap in a pulse-synchronized manner in a superposition region along a spacing axis between the electrodes, and an electrically conductive discharge channel is generated along the superposition region due to an ionization of at least the buffer gas present in the discharge space; and
- the pulsed high-energy radiation of the channel-generating beam is triggered in such a way in relation to the pulsed discharge current that the discharge channel is generated in each instance before a discharge current pulse has reached its maximum value.

The channel-generating beam is preferably divided into partial beams of intensities which are individually less than a threshold intensity required for a gas breakdown, but the sum of the intensities of the partial beams is greater than the threshold intensity.

In an advantageous manner, a laser, preferably a picosecond laser or femtosecond laser, is used as pulsed high-energy radiation of the channel-generating beam, and an electron beam or ion beam or a laser beam, preferably of a nanosecond laser, is used for the vaporizing beam.

In various embodiment forms of the method according to the invention, the vaporization of the emitter material is begun either before, at the same time as, or after the generation of the discharge channel.

In an advantageous embodiment of the method according to the invention, the partial beams of the channel-generating beam are shaped so as to have elongated beam waists and are directed and superimposed at an acute angle in each instance of at most 15° relative to a spacing axis extending between the electrodes so that the superposition region is formed along the spacing axis.

In this way, the discharge channel is generated by a channel-generating beam which is directed substantially in the same direction as the discharge channel and is superimposed exclusively in the superposition region virtually over the entire length of the spacing axis between the electrodes for ionization of the buffer gas.

In a preferred embodiment of the method according to the invention, the partial beams are focused and superimposed in each instance with a line focus in a superposition region along a selected spacing axis between the electrodes so that a common line focus is formed along the spacing axis. The partial beams can be directed into the line focus at a desired angle relative to the spacing axis, but preferably at an angle of approximately 90°. Further, the partial beams can be directed into the line focus at a desired angle to the spacing axis.

The channel-generating beam is preferably divided into partial beams of equal intensity, but can also be superimposed into partial beams of different intensity for exceeding the threshold intensity for multiphoton ionization of the buffer gas in the discharge space.

The high-energy radiation of the channel-generating beam is preferably applied with pulse durations in the picosecond or femtosecond range, preferably in the range between 1 ps and 5 ps. The high-energy radiation of the vaporizing beam advisably has pulse durations in the nanosecond range, preferably in the range between 5 ns and 20 ns.

The emitter material, in liquid or solid form, is advantageously applied to the surface of a rotating electrode, preferably regeneratively, or is supplied in the discharge space in drop form in a regular sequence of drops whose direction of advance crosses the spacing axis for the discharge channel to be generated.

The above-stated object is further met in an apparatus for generating EUV radiation from a gas discharge plasma having electrodes provided in a discharge space and a radiation source for supplying a vaporizing beam of pulsed high-energy radiation in that at least one additional radiation source is provided for supplying a pulsed high-energy radiation of a channel-generating beam, at least one beam-splitting unit is arranged in the beam path of the channel-generating beam for dividing the channel-generating beam into partial beams, and at least one beam-shaping unit is provided for shaping the respective partial beams and for focused pulse-synchronized superposition of beam focuses of the two partial beams in a superposition region between the electrodes in the discharge space in order to generate an electrically conductive discharge channel along a spacing axis in the superposition region as a result of an ionization at least of buffer gas present in the discharge space, and means for triggering the pulsed high-energy radiation of the channel-generating beam with a pulsed discharge current which is generated between the electrodes are arranged in such a way that the discharge channel is generated in each instance before a discharge current pulse reaches its maximum value.

It is preferable that the channel-generating beam is generated in partial beams having intensities which are individually less than a threshold intensity required for a gas breakdown for an avalanche multiphoton ionization, but the sum of the intensities of the partial beams is greater than the threshold intensity. An embodiment in which the partial beams are supplied by different radiation sources lies within the scope of the invention.

In an advantageous embodiment of the apparatus according to the invention, the beam-shaping unit is constructed in such a way that the partial beams are directed to a spacing axis extending between the electrodes, and the superposition region of the partial beams is formed along the spacing axis between the electrodes.

For this purpose, the beam-shaping unit is advantageously constructed in such a way that the partial beams are oriented at acute angles of at most 15° relative to the spacing axis in each instance and are superimposed with elongated beam waists along the spacing axis between the electrodes.

In another advantageous embodiment of the apparatus according to the invention, the beam-shaping unit is constructed in such a way that the partial beams in each instance have a line focus and are superimposed in the superposition region in a common line focus along the spacing axis.

The at least one beam-splitting unit and the at least one beam-shaping unit are constructed for splitting and shaping either laser radiation or particle radiation.

A particularly advisable embodiment of the invention is characterized in that the electrodes are oriented parallel to one another and are spaced-apart, disk-shaped electrodes, the electrode functioning as anode has a smaller diameter than the electrode functioning as cathode, and the channel-generating beam is oriented so as to pass close by an outer edge of the anode in direction of the cathode and is focused in the form of two partial beams by means of a beam-shaping unit in the superposition region between the electrodes, the focuses being formed as elongated laser waists.

In an advantageously modified variant, the electrodes are oriented parallel to one another and are spaced-apart, circulating guided electrodes, areas of whose surface are guided, respectively, through a tub containing a liquid emitter material, and the channel-generating beam is directed along the spacing axis to the cathode so as to pass close by the electrode functioning as anode without contacting it.

In another embodiment form, the electrodes are two disk-shaped electrodes rotating respectively around an axis of rotation D in a region where their circumferential surfaces are closer to one another, wherein the partial beams of the channel-generating beam are superimposed in a common line focus along the spacing axis between the electrodes.

The emitter material can advantageously be supplied in solid or liquid form at least in a surface region around the base of the spacing axis of one of the electrodes (e.g., cathode) on the surface facing the other electrode (e.g., anode). In so doing, the electrode rotates around an axis of symmetry and is preferably regeneratively coated.

In a second advisable manner, the emitter material is supplied in the form of drops between the electrodes as a series of drops whose direction of advance crosses the spacing axis for the discharge channel to be generated.

The invention is based on the underlying idea that the conversion efficiency in the generation of EUV radiation from a discharge plasma can be further increased by providing a narrowly defined local discharge channel for the electric discharge, which allows the discharge current between the electrodes to flow exclusively through the vaporized emitter material.

According to the invention, this underlying idea is realized in that an electrically conductive discharge channel which is locally defined by a spacing axis and is oriented from electrode surface to electrode surface is generated in the buffer gas prior in time to the discharge process between the electrodes without high intensities ($W/cm^2$) of the high-energy radiation used for preparing the electric gas discharge being present elsewhere in the discharge space.

This is achieved in that, as a result of spatially dividing the channel-generating beam into two partial beams with divided intensity, the pulsed high-energy radiation of the channel-generating beam is transported through the discharge space to the locally defined location of the desired discharge channel without the individual partial beams generating an ionization of the gas between the electrodes outside the location where the partial beams are superimposed to a degree which would lead to an unwanted gas breakdown during the electric discharge.

Multiphoton ionization, as it is called, is the crucial ionization process taking place during the generation of the discharge channel. In this connection, the number of ion pairs generated in the buffer gas is proportional to Ik, where I ($W/cm^2$) is the intensity of the laser pulse and the exponent k is a number greater than 1. For example, when using a Nd:YAG laser as the source of the channel-generating beam and argon as buffer gas, the value for k is approximately 10.

Since multiphoton ionization is an immediate process, i.e., the ions are generated within a pulse duration of the channel-generating beam, the shorter the wavelength of radiation (e.g., <1 μm wavelength) and the higher the peak intensity of the channel-generating beam, the greater the efficiency of the multiphoton ionization. At a threshold intensity which depends upon the selected buffer gas among other things, an avalanche ionization occurs so that when the threshold intensity is slightly exceeded the degree of ionization increases dramatically from values with less than 1% ionization to complete ionization.

In order to generate a discharge channel in the manner described above, pulses of the partial beams must arrive in the superposition region simultaneously, i.e., so as to be pulse-synchronized. In this regard, it does not matter whether the pulses of the partial beams originate from the same pulse or from different pulses of the channel-generating beam or even from different radiation sources.

A pulsed high voltage applied to the electrodes is triggered in relation to the pulses of the channel-generating beam in such a way that a discharge current pulse between the electrodes reaches its maximum value after the discharge channel is generated so that a gas breakdown takes place along the discharge channel generated by the ionized buffer gas and the discharge current flowing through the latter generates the gas discharge plasma.

The invention shows how it is possible for an area of high energy density to be created in the discharge space in a clearly defined and reproducible manner with respect to its spatial position and shape as well as its temporal character as the starting point for the generation of a locally limited gas discharge plasma. In addition to allowing an increase in conversion efficiency, the invention also makes possible a high spatial stability of the location for the formation EUV radiation so as to provide EUV radiation with improved pulse-to-pulse stability.

BRIEF DESCRIPTION OF THE DRAWINGS

The invention will be described more fully in the following with reference to embodiment examples and drawings. The drawings show.

DETAILED DESCRIPTION OF THE PREFERRED EMBODIMENTS

Figure 1:
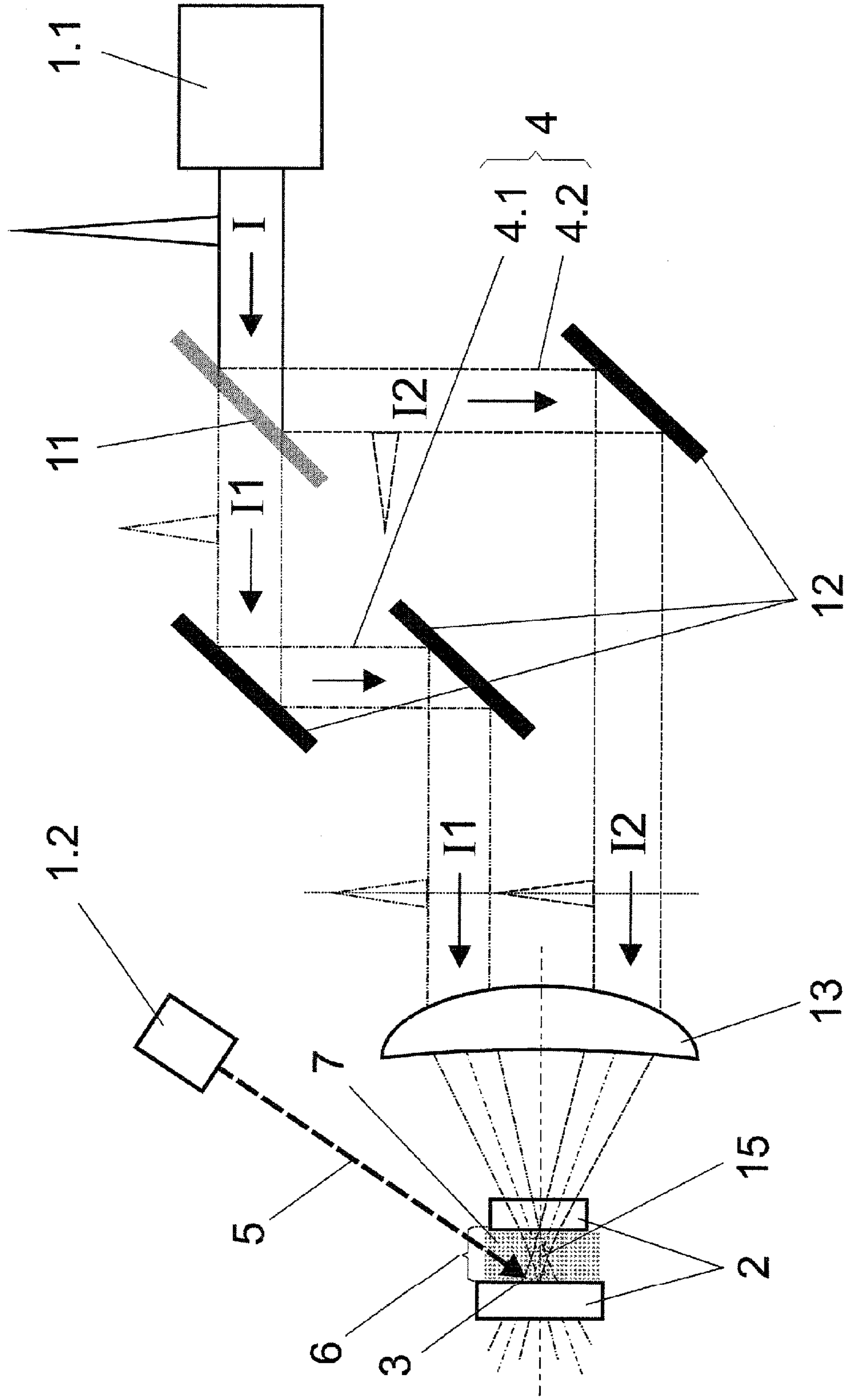
FIG. 1 a schematic illustration of an apparatus according to the invention.

According to FIG. 1, the basic construction of an arrangement for the generation of a channel-generating beam 4 for providing a locally narrowly defined gas discharge plasma comprises a radiation source 1.1 for supplying a pulsed high-energy radiation of a channel-generating beam 4, a beam-splitting unit 11 arranged on the beam path side of the radiation source 1.1 for dividing the channel-generating beam 4 into two partial beams 4.1, 4.2, and a beam-shaping unit 13 for shaping the partial beams 4.1, 4.2 for achieving focus regions (beam waists) of the partial beams 4.1, 4.2 and a pulse-synchronized superposition of the beam waists of the partial beams 4.1, 4.2 in a discharge space 6 between two electrodes 2 located in the discharge space 6. Further, a radiation source 1.2 for supplying a pulsed high-energy radiation of a vaporizing beam 5 is provided for vaporizing an emitter material 3.

Beam-deflecting elements 12 through which the partial beams 4.1, 4.2 are guided on different beam pathways in a superposition region between the electrodes 2 are arranged in the beam paths of the partial beams 4.1, 4.2.

The pulses of radiation of the channel-generating beam 4 are represented by triangles, their intensities I, I1, I2 are represented schematically by the height and surface area of the triangles.

After passing through the beam-splitting unit 11, the channel-generating beam 4 is split into a first partial beam 4.1 with an intensity I1 and a second partial beam 4.2 with an intensity 12, where I1=I2. The partial beams 4.1, 4.2 are guided by the beam-deflecting element 12 and directed to the beam-shaping unit 13. Pulses of the high-energy radiation of the channel-generating beam 4 arrive in a pulse-synchronized manner at the beam-shaping unit 3. The partial beams 4.1, 4.2 are directed between the electrodes 2 into the discharge space 6 so as to converge with one another through the action of the beam-shaping unit 13 so that the focuses (beam waists) of the partial beams 4.1, 4.2 are superimposed and penetrate one another along a superposition region 1.

Figure 2:
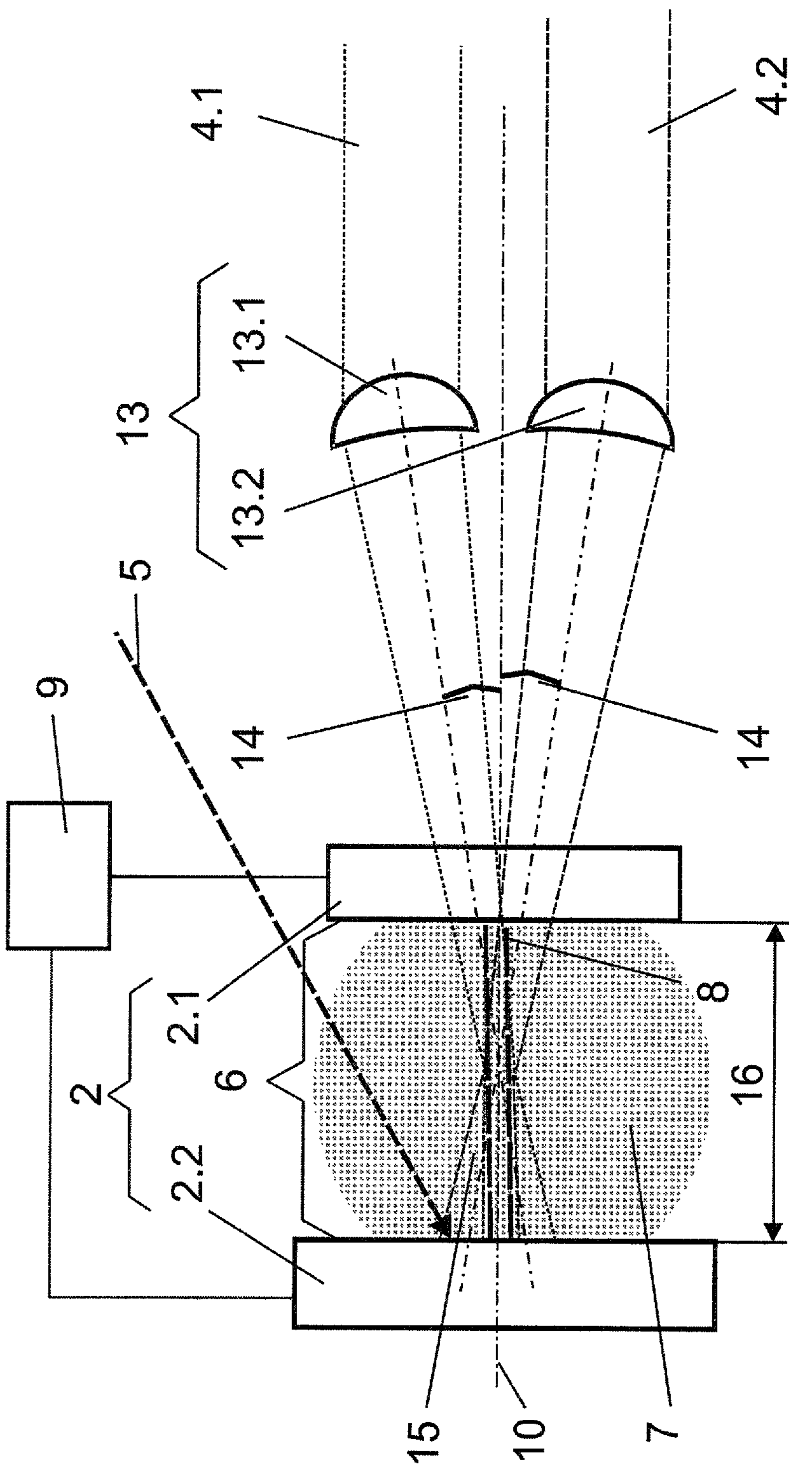
FIG. 2 a schematic illustration of a section of a beam path of a first apparatus according to the invention having a beam-shaping unit and focus volume.

In a first embodiment of the apparatus according to the invention, according to FIG. 2, an anode 2.1 and a cathode 2.2 are provided as disk-shaped electrodes 2 which are oriented parallel to one another and spaced apart from one another. The diameter of the anode 2.1 is smaller than the diameter of the cathode 2.2. A buffer gas 7 is located in a discharge space 6 between the electrodes 2.

Perpendicular to the surfaces of the electrodes 2, a spacing axis 10 directed from the outside edge of the anode 2.1 to the surface of the cathode 2.2 is defined parallel to an axis of symmetry (not shown) extending through the centers of the electrodes 2. Ideally, the spacing axis 10 should be considered as perpendicular (as the shortest distance line between the electrodes), but can diverge from the perpendicular when the electrode geometry does not permit of radiation along the shortest distance line, or if this is too technically complicated.

The electrodes 2 communicate with a controlled electric power supply 9 and are supplied with a pulsed discharge current by the latter in a controlled manner. The pulse repetition frequencies of the radiation of the channel-generating beam 4 and of the discharge current are adapted to one another and offset relative to one another in such a way that a discharge channel 8 (indicated in dashes) is generated along the spacing axis 10 in the superposition region 15 by the ionization of the buffer gas 7 before a pulse of the discharge current reaches its maximum value. A power supply 9 of this kind is provided in all of the described embodiment examples.

The pulsed radiation of the vaporizing beam 5 has a pulse energy per area unit of 5 mJ/cm$^2$ and a pulse duration of 5 ns.

In modified embodiments of the invention, the pulsed radiation of the vaporizing beam 5 can have pulse energies per area unit of >5 mJ/cm$^2$ and pulse durations in a range appreciably greater than 5 ns, preferably between 5 ns and 20 ns. The vaporizing beam 5 can be directed to the emitter materials 3 to be vaporized at any angle that allows an open path to the beam path of the vaporizing beam 5.

Further, a beam-shaping unit 13 is provided which comprises a first and a second beam-shaping optics unit 13.1 and 13.2 in the form of cylindrical lenses. The first and second beam-shaping optics units 13.1 and 13.2 lie on different sides with respect to the spacing axis 10 and are identically designed.

Pulsed high-energy radiation of the first partial beam 4.1 is directed through the first beam-shaping optics unit 13.1 and the high-energy radiation of the second partial beam 4.2 is directed through the second beam-shaping optics unit 13.2, proceeding in each instance from the direction of the anode 2.1, at angles 14 of ±15° relative to the spacing axis 10 (not shown to scale) into the superposition region 15. In so doing, the partial beams 4.1, 4.2 are shaped in such a way that their elongated beam waists overlap and penetrate one another in the superposition region 15.

The diameter of the anode 2.1 is constructed so as to be smaller than the diameter of the cathode 2.2. Therefore, the focused partial beams 4.1 and 4.2 pass close by an outer edge of the anode 2.1 onto a surface of the cathode 2.2 facing the anode 2.1. The partial beams 4.1 and 4.2 overlap along the spacing axis 10 in an overlap area 15 starting in front of the anode 2.1 up to the surface of the cathode 2.2 facing the anode 2.1. Since the pulses of the high-energy radiation of the channel-generating beam 4 arrive at the beam-shaping unit 13 in a pulse-synchronized manner and the beam-shaping optics units 13.1 and 13.2 are arranged equidistant from the superposition region 15, the rays of the partial beams 4.1, 4.2 are also superimposed along the superposition region 15 in a pulse-synchronized manner. The first and second intensities I1 and I2 are summed in the superposition region 15 to the degree that the partial beams 4.1 and 4.2 penetrate one another. The dimensions and arrangement of the discharge space 6, the beam-shaping unit 13 and the angle 14 are selected in such a way that the additive effect of the first and second intensities I1 and I2 along a length 16 equal to the distance between the electrodes 2 along the spacing axis 10 exceeds a threshold intensity required for a gas breakdown in the buffer gas 7 before a pulse of a discharge current applied to the electrodes 2 reaches its maximum value.

The first partial beam 4.1 and second partial beam 4.2 end, respectively, on the surface of the cathode 2.2, where their energy dissipates and is carried off by heat conduction.

As a result of the ionization of the buffer gas 7 along the spacing axis 10, a discharge channel 8 is generated in the buffer gas 7 through which a flow of current between the electrodes 1 of the discharge channel 8 is possible.

With the channel-generating synchronous superposition of the pulses of the partial beams 4.1, 4.2, in immediate temporal proximity, namely, (depending on the vaporization behavior of the emitter material 3) shortly before, at the same time as, or shortly thereafter, an emitter material 3 applied to the surface of the cathode 2.2 is vaporized by the vaporizing beam 5. The pulse of the vaporizing beam 5 is likewise triggered in relation to the pulse of the discharge current in such a way that the vaporization of the emitter material 3 is completed before the maximum value of the discharge current is reached.

In other embodiments of the apparatus according to the invention, an emitter material 3 can be supplied in the form of a continuous sequence of drops.

Also, the partial beams 4.1, 4.2 can be directed into the superposition region 15 at different angles in further embodiments.

Figure 3:
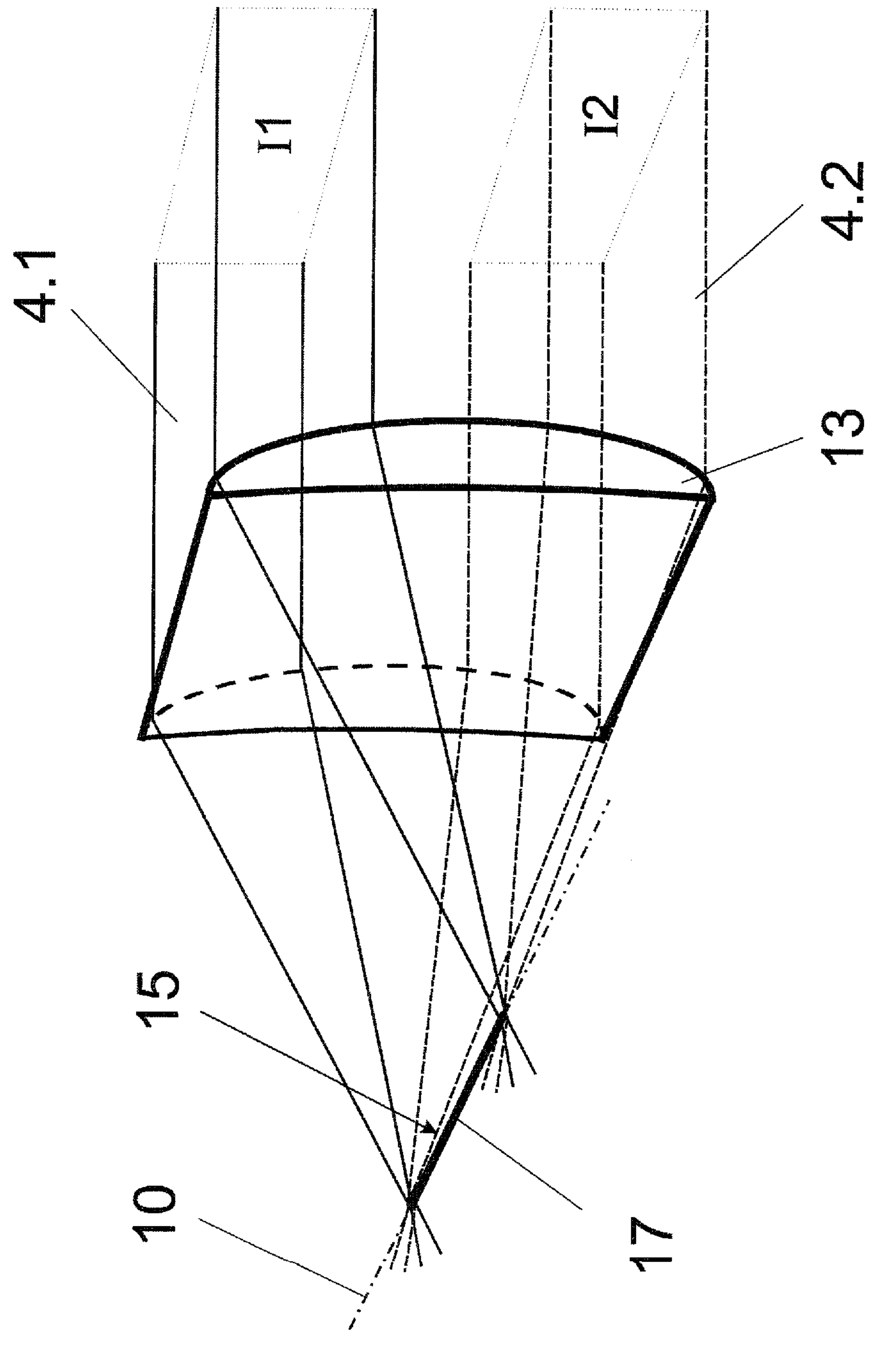
FIG. 3 a schematic illustration of a section of a beam path of a second apparatus according to the invention having a beam-shaping unit and line focus.

In a second embodiment of the invention, as is shown schematically in FIG. 3, the first partial beam 4.1 and the second partial beam 4.2 are each directed by a line focus 17 into the superposition region 15 which extends along the spacing axis 10 and perpendicular to the incident direction of the partial beams 4.1, 4.2.

A Nd:YAG laser with adjustable laser pulse durations in the range of 1 ps to 5 ps preferably serves as radiation source 1.1. The beam cross section is expanded by means of a telescope contained in the beam-shaping unit 13 and is formed to a line focus, respectively, and directed into the spacing axis 10 by a cylindrical lens.

A common line focus 17 is formed along the spacing axis 10 by means of superimposed partial beams 4.1, 4.2. The partial beams 4.1, 4.2 diverge in different directions after the common line focus 17 so that an intensity of the energy beam sufficient for the ionization of the buffer gas 7 (not shown) is reached and a gas breakdown channel is generated only in the superposition region 15 of their individual line focuses.

With respect to the intensities I1 and I2 of the two partial beams 4.1, 4.2, I1≠I2 and I1+I2>threshold intensity. Pulses of the high-energy radiation of the channel-generating beam 4 of the partial beams 4.1, 4.2 run through the beam-shaping unit 13 so as to be pulse-synchronized, each pulse having a duration of 1 ps.

Because the partial beams 4.1, 4.2 are guided according to the invention on different beam pathways, there is a high spatial resolution perpendicular to the longitudinal extension of the common line focus 17. The transverse extension of the line focus 17 perpendicular to the spacing axis 10 is less than 0.5 mm.

The threshold intensity of the multiphoton ionization for generating a gas breakdown in the discharge space 6 is clearly defined spatially and is reached and exceeded exclusively in the common line focus 17.

Figure 4A:
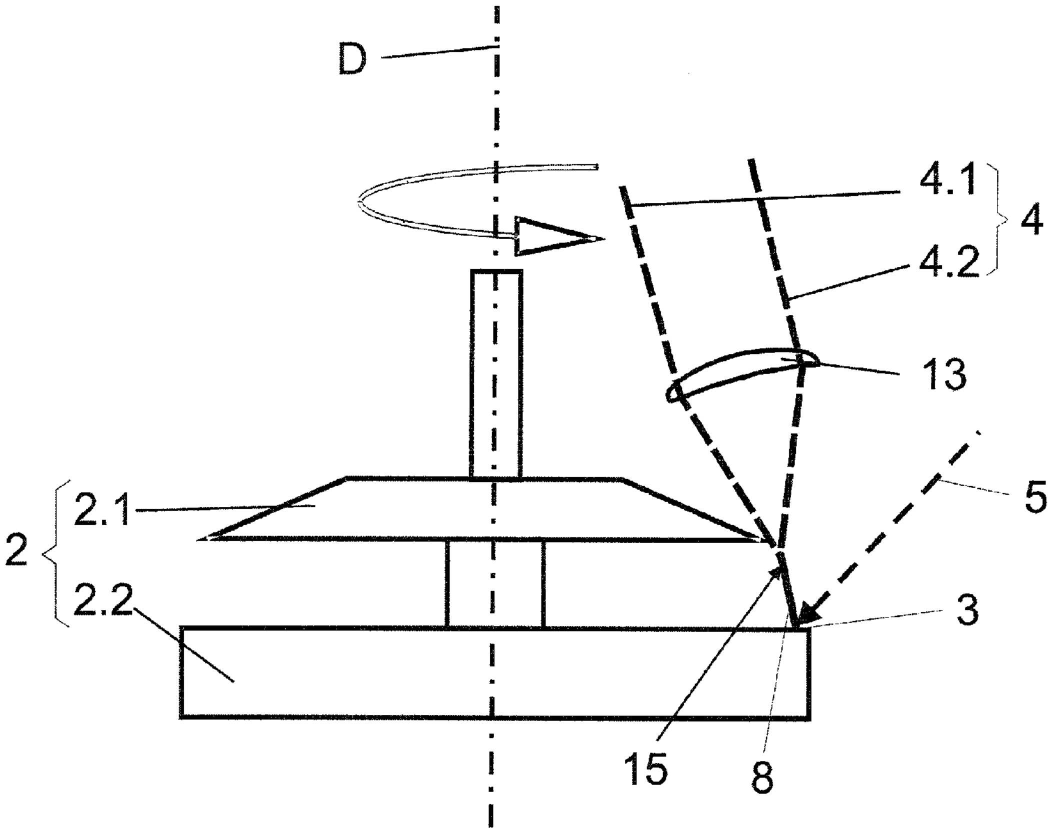
FIG. 4 a first embodiment of the apparatus according to the invention having rotating electrodes of different diameters a) with solid or liquid emitter material applied to an electrode surface, and b) with liquid emitter material introduced between the electrodes as a series of drops.

In a third variant of the apparatus according to the invention according to FIG. 4*a*, the embodiment of the method according to the invention described in FIG. 2 is used. There are two disk-shaped electrodes 2 rotating around an axis of rotation D, namely, an anode 2.1 and a cathode 2.2. The diameter of the anode 2.1 is smaller than the diameter of the cathode 2.2.

The channel-generating beam 4 is aligned so as to pass close by the outside edge of the anode 2.1 and is focused in the form of two partial beams 4.1, 4.2 by means of a beam-shaping unit 13 in the superposition region 15 between the electrodes 2. The focuses are formed as elongated laser waists as is shown in FIG. 2.

Further, a vaporizing beam 5 of a pulsed high-energy radiation is directed to the foot of the superposition region 15 on the surface of the cathode 2.2. An emitter material 3 located on the cathode 2.2 is vaporized by the vaporizing beam 5 while a discharge channel 8 is still being generated between the electrodes 2 by the channel-generating beam 4.

Figure 4B:
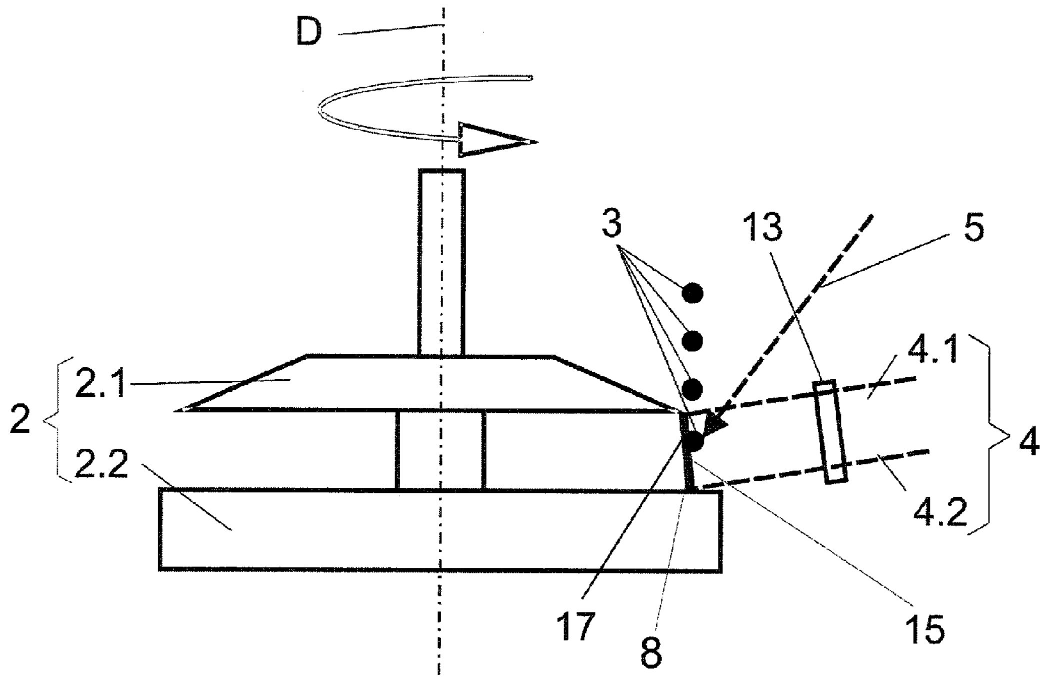

The electrode arrangement shown in FIG. 4*b* corresponds to that described in FIG. 4*a*; but in this case there is a common line focus 17 according to FIG. 3 and an emitter material 3 in the form of droplets in the superposition region 15. The channel-generating beam 4 is directed to the spacing axis 10 in the discharge area 15 from a lateral direction approximately parallel to the electrode surfaces.

The vaporizing beam 5 is directed into the discharge space 6 in such a way and is controlled in such a way that individual droplets of the emitter material 3 are vaporized by it. The regular supply of emitter material 3 is carried out according to known art.

A droplet has a diameter of about 100 μm. After it is vaporized by the vaporizing beam 5, the discharge current begins to flow between the electrodes 2 and along the discharge channel 8. The vaporized droplet is heated by the discharge current. An optimum EUV emission is reached at a temperature kT between 3 and 40 eV. When heated, the droplet, and therefore the EUV radiation-emitting zone, expands very fast at a velocity of 10 to 20 μm/ns. Depending on the etendue of the optical system at hand, shadowing occurs at apertures in the optical system and, therefore, radiation losses occur along the light path if the emitting zone has an expansion of >0.8 mm. In order to prevent this, the heating process is configured to be sufficiently fast. The droplet is initially smaller in diameter than the effective diameter of the discharge current. Therefore, the speed at which the droplet is heated is scaled to the current density (A/mm$^2$). An increase in current density is achieved precisely through the additional narrow discharge channel 8.

When the channel-generating beam 4 is operated at a shorter wavelength and shorter pulse duration, the channel-generating beam 4 can be used as vaporizing beam 5 for a droplet-shaped emitter material 3.

Figure 5A:
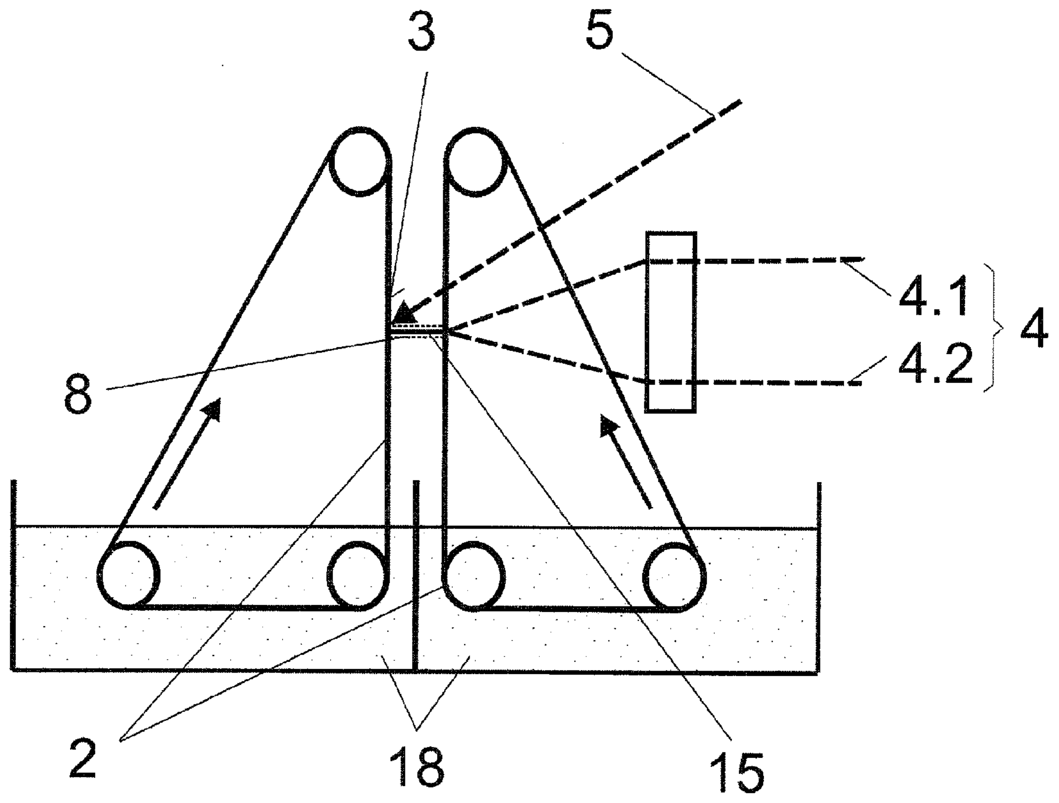
FIG. 5 a second embodiment of the apparatus according to the invention having circulating ribbon electrodes a) with solid emitter material applied to one of the electrodes and b) with liquid emitter material introduced between the electrodes as a series of drops.

FIG. 5*a* shows another embodiment of the apparatus according to the invention having circulating restiform-shaped electrodes 2, surfaces of which are guided in each instance through a tub 18. The tubs 18 contain liquid tin which adheres to the surface of the electrodes 2. The vaporizing beam 5 is focused on the emitter material 3 in a region of the surface of an electrode 2. The channel-generating beam 4 is directed in such a way that a discharge channel 8 is formed between the electrodes 2.

Figure 5B:
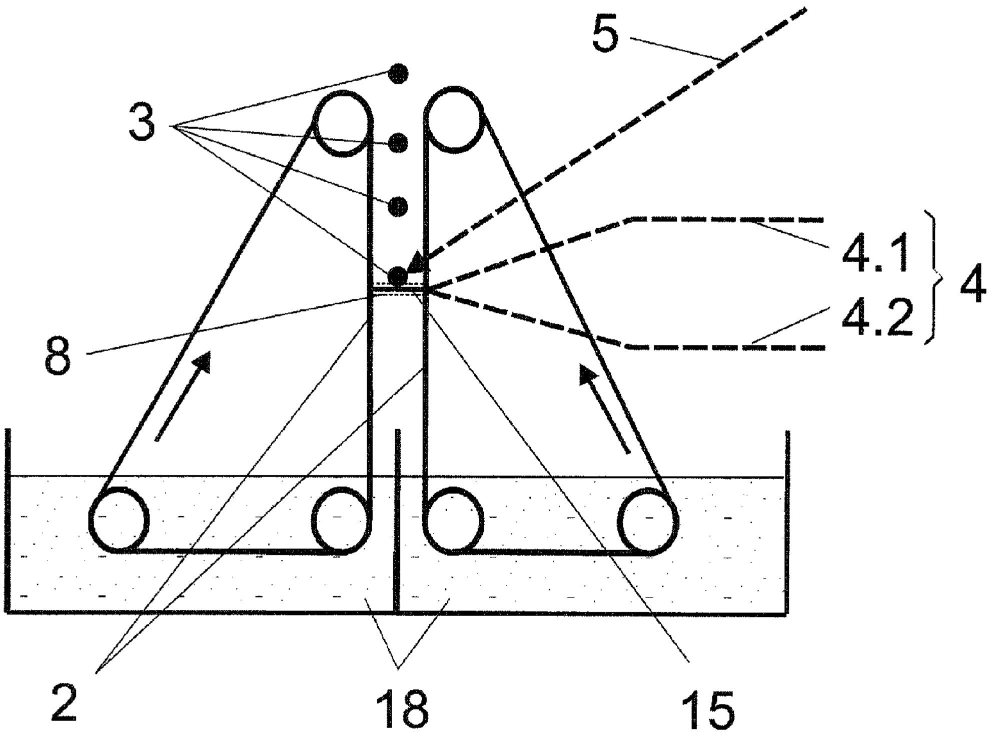

FIG. 5*b* shows an apparatus according to the invention of the type just described having emitter material 3 in droplet form.

Figure 6A:
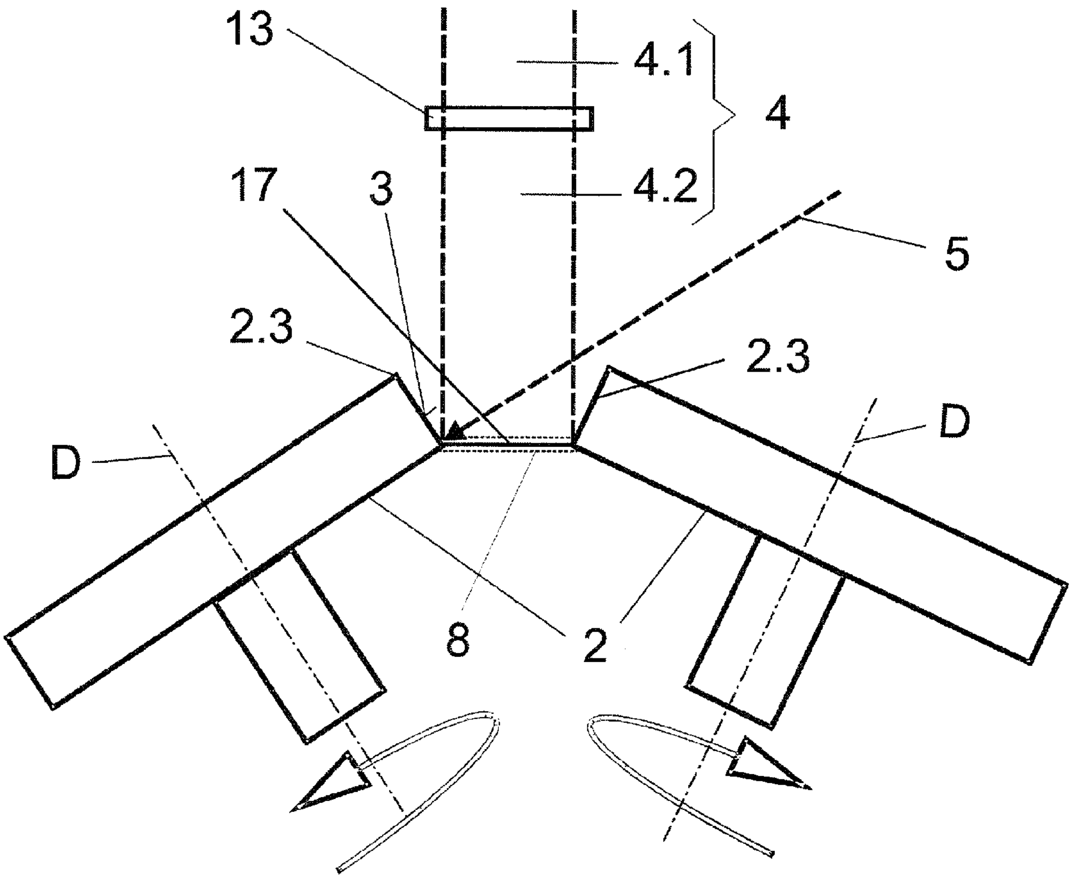
FIG. 6 a third embodiment of the apparatus according to the invention having a line focus between inclined rotating electrodes a) with solid emitter material applied to an electrode surface and b) with liquid emitter material introduced between the electrodes as a series of drops.
Figure 6B:
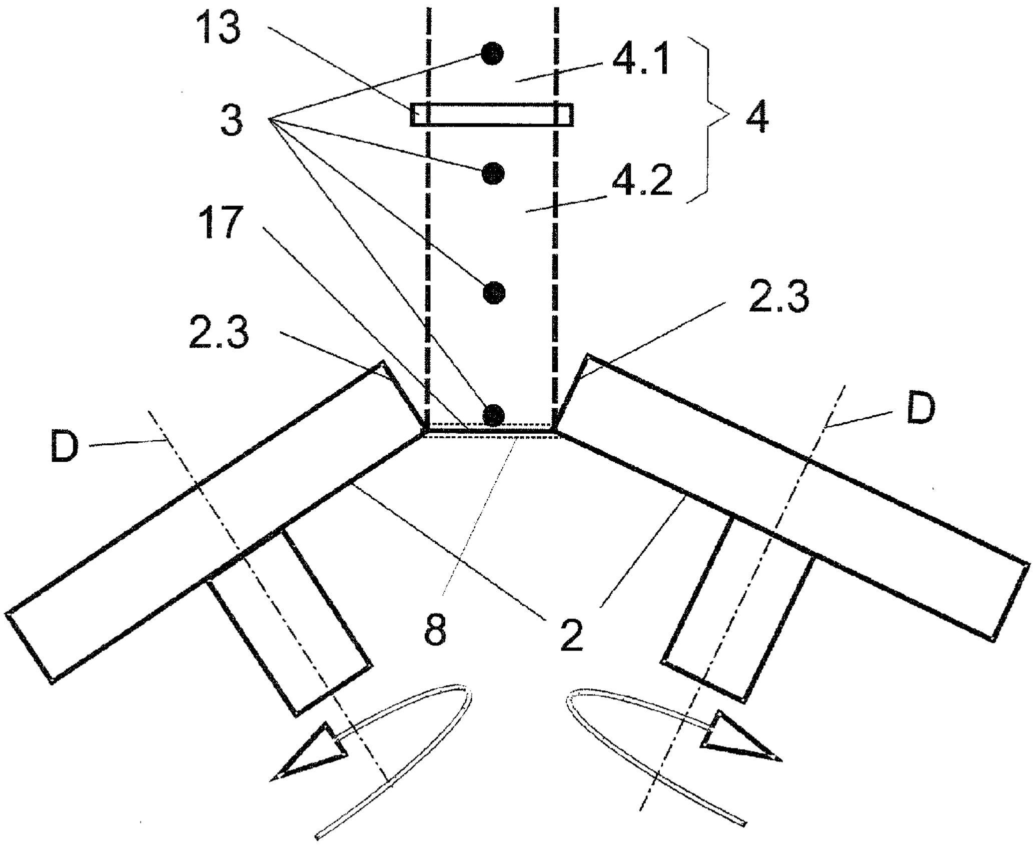

The possible embodiment of the method shown in FIG. 3 and described above is applied again in an embodiment according to FIG. 6*a* and FIG. 6*b* with a modified configuration of the electrodes 2.

FIG. 6*a* shows a line focus 17 which is generated in a discharge space 6. The discharge space 6 is located between the circumferential surfaces 2.3 of two disk-shaped electrodes 2 which rotate, respectively, around an axis of rotation D, these circumferential surfaces 2.3 being closer to one another in one area. An emitter material 3 is vaporized on the surface of one of the electrodes 2 by the vaporizing beam 5, while the discharge channel 8 is formed orthogonal to the direction of the beam paths of the first partial beam 4.1 and second partial beam 4.2 by the action of the channel-generating beam 4.

FIG. 6*b* shows another embodiment in which an emitter material 3 is provided in drop form, but a vaporizing beam 5 is not provided. The emitter material 3 is supplied in the form of drops with a regular drop shape perpendicularly via the line focus 17 in such a way that a drop of the emitter material 3 falls into the line focus 17 when the discharge channel 8 is generated and the discharge voltage at the electrodes 2 approaches its maximum value.

The vaporization of the emitter material 3 is then carried out through the effect of the pulse of the summed intensities of the partial beams 4.1, 4.2 in the common line focus 17, wherein a greater pulse duration (ns range) must be selected and, if necessary, a shorter wavelength must also be used. As a result of the vaporization of the emitter material 3 directly in a region of the discharge channel 8, a spatially and temporally defined discharge channel 8 is generated from ionized buffer gas 7 and vaporized emitter material 3 between the electrodes 2 before the discharge current between the electrodes 2 has reached its maximum value and causes the conversion of vaporized emitter material 3 to EUV-emitting gas discharge plasma.

The method according to the invention and the apparatuses according to the invention can be used in all systems having rotating electrodes or electrodes in the form of moving ribbons or wires and using pinch-type dense, hot discharge plasmas. Application thereof is preferably directed to EUV lithography, particularly in the spectral band of 13.5±0.135 nm which corresponds to the reflection range of typically employed alternating layer optics (multilayer optics) with Mo/Si layers, but is not limited to this.

REFERENCE NUMERALS

1.1 radiation source (of the radiation of the channel-generating beam)
1.2 radiation source (of the radiation of the vaporizing beam)
2 electrode
2.1 anode
2.2 cathode
2.3 circumferential surface (of the electrode)
3 emitter material
4 channel-generating beam
4.1 first partial beam
4.2 second partial beam
5 vaporizing beam
6 discharge space
7 buffer gas
8 discharge channel
9 power supply
10 spacing axis
11 beam-splitting unit
12 beam-deflecting unit
13 beam-shaping unit
13.1 first optics unit
13.2 second optics unit
14 angle

15 superposition region
16 length
17 common line focus
18 tub
I intensity
I1 intensity (of the first partial beam 4.1)
I2 intensity (of the second partial beam 4.2)
D axis of rotation

What is claimed is:

1. A method for generating EUV radiation from a gas discharge plasma, comprising the steps of:

providing an emitter material in a discharge space between electrodes, the discharge space contains at least one buffer gas;

providing a channel-generating beam of pulsed high-energy radiation, the channel-generating beam being formed by at least two partial beams;

shaping, focusing and directing said at least two partial beams into a discharge space between the electrodes in such a way that respective foci of said at least two partial beams are superimposed in a pulse-synchronized manner in a superposition region along a spacing axis between the electrodes;

generating an electrically conducting discharge channel along the superposition region due to an ionization of the at least one buffer gas present in the discharge space;

vaporizing said emitter material in the discharge space by irradiation with pulsed high-energy radiation of a vaporizing beam; and converting the vaporized emitter material into a discharge plasma emitting EUV radiation by means of a pulsed discharge current generated between the electrodes;

wherein the pulsed high-energy radiation of the channel-generating beam is triggered in such a way with the pulsed discharge current that the discharge channel is generated in each instance before a discharge current pulse has reached its maximum value, and wherein intensities of said at least two partial beams of the channel-generating beam are individually less than a threshold intensity for a breakdown of the buffer gas, and wherein a sum of the intensities of the partial beams is greater than the threshold intensity.

2. The method according to claim 1, wherein vaporizing the emitter material begins before generating the discharge channel.

3. The method according to claim 1, wherein vaporizing the emitter material begins at the same time as generating the discharge channel.

4. The method according to claim 1, wherein vaporizing the emitter material begins immediately after generating the discharge channel.

5. The method according to claim 1, wherein the partial beams of the channel-generating beam are shaped so as to have elongated beam waists and are directed and superimposed at an acute angle in each instance of at most 15° relative to the spacing axis between the electrodes so that the superposition region is formed along the spacing axis.

6. The method according to claim 1, wherein the partial beams are focused and superimposed in each instance with a line focus in the superposition region along the spacing axis so that a common line focus is formed along the spacing axis.

7. The method according to claim 1, wherein the high-energy radiation of the vaporizing beam is used with pulse durations in the nanosecond range, and the radiation of the channel-generating beam is used with pulse durations in or below the picosecond range.

8. An apparatus for generating EUV radiation from a gas discharge plasma, comprising:

electrodes for generating a gas discharge which are disposed in a discharge space containing at least one buffer gas;

a radiation source for generating a vaporizing beam of a pulsed high-energy radiation for vaporizing an EUV emitter material in the discharge space;

at least one additional radiation source for supplying a channel-generating beam of pulsed high-energy radiation;

at least one beam-splitting unit disposed in the beam path of the channel-generating beam for dividing the channel-generating beam into at least two partial beams;

at least one beam-shaping unit for shaping the respective partial beams and for focused pulse-synchronized superimposing of beam waists of the at least two partial beams along a superposition region between the electrodes in the discharge space in order to generate an electrically conductive discharge channel along the superposition region along a spacing axis between the electrodes; and means for synchronizing the pulsed high-energy radiation of the channel-generating beam with a pulsed discharge current applied to the electrodes in order to trigger the generation of the discharge channel in each instance before a discharge current pulse reaches its maximum value;

wherein the partial beams of the channel-generating beam are generated with intensities which are individually less than a threshold intensity for a breakdown of the buffer gas, and wherein a sum of the intensities of the partial beams is greater than the threshold intensity.

9. The apparatus according to claim 8, wherein the partial beams in the beam-shaping unit are directed to a spacing axis extending between the electrodes to form the superposition region) along the spacing axis of the partial beams.

10. The apparatus according to claim 9, wherein the partial beams in the beam-shaping unit are formed each with a line focus and are directed to superimpose in the superposition region in a common line focus along the spacing axis.

11. The apparatus according to claim 9, wherein the partial beams in the beam-shaping unit are formed with elongated beam waists and are superimposed at acute angles of at most 15° in each instance relative to the spacing axis along the spacing axis.

12. The apparatus according to claim 8, wherein the electrodes are disk shaped and are spaced apart in parallel to one another, wherein a first electrode functioning as anode has a smaller diameter than a second electrode functioning as cathode, and wherein the channel-generating beam is directed to the cathode such as to closely pass by an outer edge of the anode without contacting it and is focused in the form of two partial beams in the superposition region between the electrodes by means of the beam-shaping units, wherein the focuses are formed as elongated laser waists.

13. The apparatus according to claim 8, wherein the electrodes are circulating guided electrodes, areas of which are spaced apart in parallel within the discharge region and are guided each through a tub containing a liquid emitter material for providing an emitter material coating of the electrodes in the discharge region, and wherein the channel-generating beam is directed to one of the electrodes functioning as a cathode and aligned with the spacing axis so as to closely pass by another one of the electrodes functioning as an anode.

14. The apparatus according to claim 8, wherein the electrodes comprise two disk-shaped electrodes rotating respectively around an axis of rotation which are tilted to one another in such a way that circumferential surfaces of the disk-shaped electrodes are closer to each other in the discharge region than in other regions, and the partial beams of the channel-generating beam are superimposed in a common line focus along the spacing axis between the closer circumferential surfaces of the electrodes within the discharge region.

15. The apparatus according to claim 8, wherein the emitter material is provided on a surface of one of the electrodes functioning as a cathode at least in a surface region facing another electrode functioning as an anode and being disposed around a base of the spacing axis.

16. The apparatus according to claim 8, wherein the emitter material is supplied in the form of drops into the discharge region between the electrodes in a direction crossing the spacing axis.

* * * * *